(12) United States Patent
James (10) Patent No.: US 9,077,699 B1
(45) Date of Patent: Jul. 7, 2015

(54) TEXT CHAT

(75) Inventor: Constance James, Kannapolis, NC (US)

(73) Assignee: Bank of America Corporation, Charlotte, NC (US)

( * ) Notice: Subject to any disclaimer, the term of this patent is extended or adjusted under 35 U.S.C. 154(b) by 1191 days.

(21) Appl. No.: 12/208,509

(22) Filed: Sep. 11, 2008

(51) Int. Cl.
*G06Q 40/00* (2012.01)
*H04L 29/06* (2006.01)
*G06Q 20/12* (2012.01)

(52) U.S. Cl.
CPC ............... *H04L 63/08* (2013.01); *G06Q 20/12* (2013.01)

(58) Field of Classification Search
CPC ..... H04L 63/08; H04L 63/0823; G06F 21/41; G06Q 20/12
USPC .................................... 726/17, 27, 4; 705/67
See application file for complete search history.

(56) References Cited

U.S. PATENT DOCUMENTS

| | | | |
|---|---|---|---|
| 5,958,014 A | | 9/1999 | Cave |
| 5,961,332 A * | | 10/1999 | Joao .............................. 434/236 |
| 6,099,319 A * | | 8/2000 | Zaltman et al. ................ 434/236 |
| 6,120,440 A * | | 9/2000 | Goknar .......................... 600/300 |
| 6,280,198 B1 * | | 8/2001 | Calhoun et al. ............... 434/236 |
| 6,334,778 B1 * | | 1/2002 | Brown .......................... 434/258 |
| 6,349,290 B1 | | 2/2002 | Horowitz et al. |
| 6,564,244 B1 | | 5/2003 | Ito et al. |
| 6,611,590 B1 | | 8/2003 | Lu et al. |
| 6,745,178 B1 | | 6/2004 | Emens et al. |
| 6,842,877 B2 * | | 1/2005 | Robarts et al. ................ 715/708 |
| 6,922,689 B2 | | 7/2005 | Shtivelman |
| 7,090,582 B2 | | 8/2006 | Danieli et al. |
| 7,289,949 B2 * | | 10/2007 | Warner et al. ..................... 704/9 |
| 7,452,278 B2 | | 11/2008 | Chen et al. |
| 7,464,272 B2 | | 12/2008 | Danieli |
| 7,487,248 B2 * | | 2/2009 | Moran et al. .................. 709/227 |
| 7,561,176 B2 | | 7/2009 | Westerfield et al. |
| 7,694,139 B2 | | 4/2010 | Nachenberg et al. |
| 7,802,110 B2 | | 9/2010 | Morais |
| 7,882,243 B2 | | 2/2011 | Ivory et al. |
| 2001/0054064 A1 * | | 12/2001 | Kannan ......................... 709/203 |
| 2003/0013981 A1 * | | 1/2003 | Gevins et al. ................. 600/544 |
| 2003/0059750 A1 * | | 3/2003 | Bindler et al. ................ 434/236 |
| 2003/0137544 A1 | | 7/2003 | Mears et al. |

(Continued)

FOREIGN PATENT DOCUMENTS

| | | |
|---|---|---|
| EP | 0813175 | 12/1997 |
| WO | WO03/025776 | 3/2003 |

OTHER PUBLICATIONS

Unknown, 2005, Well Fargo, Home page, Online account access, Mutual Fund Investments, Brokerage Accounts.*

(Continued)

*Primary Examiner* — Scott S Trotter
(74) *Attorney, Agent, or Firm* — Michael A. Springs; Moore & Van Allen PLLC; Nicholas C. Russell (57) ABSTRACT

A method and system for determining which online banking customers of a financial institution may be invited to chat with available customer service representatives or agents. Additionally, after a customer is invited to text-chat with a customer service representative or agent, the customer may be allowed to communicate via text-chat with one or more customer service representatives or agents without redundantly inputting the customer's identification information, advantageously saving time and improving customer satisfaction.

22 Claims, 4 Drawing Sheets

(56) References Cited

U.S. PATENT DOCUMENTS

| | | |
|---|---|---|
| 2003/0187641 A1 | 10/2003 | Moore et al. |
| 2003/0187925 A1 | 10/2003 | Inala et al. |
| 2004/0039776 A1 | 2/2004 | Ballard |
| 2004/0083366 A1 | 4/2004 | Nachenberg et al. |
| 2004/0117383 A1 | 6/2004 | Lee et al. |
| 2004/0123109 A1 | 6/2004 | Choi |
| 2004/0172358 A1 | 9/2004 | Lent et al. |
| 2004/0210159 A1* | 10/2004 | Kibar ............... 600/558 |
| 2004/0224771 A1 | 11/2004 | Chen et al. |
| 2005/0071481 A1 | 3/2005 | Danieli |
| 2005/0079474 A1* | 4/2005 | Lowe ............... 434/236 |
| 2005/0097320 A1* | 5/2005 | Golan et al. ............... 713/166 |
| 2005/0113169 A1 | 5/2005 | Danieli et al. |
| 2005/0132298 A1 | 6/2005 | Lueckhoff et al. |
| 2005/0187781 A1 | 8/2005 | Christensen |
| 2005/0193055 A1* | 9/2005 | Angel et al. ............... 709/202 |
| 2005/0227233 A1* | 10/2005 | Buxton et al. ............... 435/6 |
| 2005/0245317 A1 | 11/2005 | Arthur et al. |
| 2006/0014552 A1 | 1/2006 | Cunningham et al. |
| 2006/0047958 A1 | 3/2006 | Morais |
| 2006/0080130 A1 | 4/2006 | Choksi |
| 2006/0098624 A1* | 5/2006 | Morgan et al. ............... 370/352 |
| 2006/0101098 A1* | 5/2006 | Morgan et al. ............... 707/204 |
| 2006/0112126 A1 | 5/2006 | Soto et al. |
| 2006/0150119 A1 | 7/2006 | Chesnais et al. |
| 2006/0229129 A1 | 10/2006 | Jalava et al. |
| 2006/0287105 A1 | 12/2006 | Willis |
| 2007/0004518 A1 | 1/2007 | Friesen et al. |
| 2007/0087819 A1 | 4/2007 | Van Luchene et al. |
| 2007/0130400 A1 | 6/2007 | Reisman |
| 2007/0245249 A1 | 10/2007 | Weisberg |
| 2007/0265873 A1 | 11/2007 | Sheth et al. |
| 2007/0271618 A1 | 11/2007 | Chao et al. |
| 2008/0031458 A1 | 2/2008 | Raja |
| 2008/0040419 A1 | 2/2008 | Muth |
| 2008/0052377 A1 | 2/2008 | Light |
| 2008/0072054 A1 | 3/2008 | Choi |
| 2008/0091572 A1 | 4/2008 | Kraft et al. |
| 2008/0103920 A1 | 5/2008 | Leach et al. |
| 2008/0104402 A1 | 5/2008 | Gueron et al. |
| 2008/0108426 A1 | 5/2008 | Nguyen et al. |
| 2008/0177659 A1 | 7/2008 | Lacey et al. |
| 2008/0288349 A1 | 11/2008 | Weisberg et al. |
| 2009/0064038 A1 | 3/2009 | Fleischman et al. |
| 2009/0132812 A1 | 5/2009 | Kobozev et al. |
| 2009/0182664 A1 | 7/2009 | Trombley |
| 2009/0193079 A1 | 7/2009 | Gupta et al. |
| 2009/0228704 A1 | 9/2009 | de Atley et al. |
| 2009/0235312 A1 | 9/2009 | Morad et al. |
| 2009/0249074 A1 | 10/2009 | Madhavan et al. |
| 2009/0259753 A1 | 10/2009 | Hinton et al. |
| 2009/0264070 A1 | 10/2009 | Lim |
| 2009/0276529 A1 | 11/2009 | Ivory et al. |
| 2009/0285392 A1 | 11/2009 | Leitheiser et al. |
| 2010/0031042 A1 | 2/2010 | Di Crescenzo et al. |
| 2010/0069892 A1 | 3/2010 | Steinbach et al. |
| 2010/0070758 A1 | 3/2010 | Low et al. |
| 2010/0121761 A1 | 5/2010 | Allen et al. |
| 2010/0268771 A1 | 10/2010 | Kulakowski et al. |
| 2010/0299731 A1 | 11/2010 | Atkinson |

OTHER PUBLICATIONS

Verizon Residential Support, High Speed Internet, "How does that chat feature work?" accessed Sep. 11, 2008 from http://www22.verizon.com/ResidentialHelp/HighSpeed/Email/Troubleshooting/QuestionsOne/86900.htm.

Siu Cheung Hui et al. "Text Mining for Chat Message Analysis", 2008 IEEE, pp. 411-416.

* cited by examiner

| SERVICE SUBLEVEL OR DESCRIPTOR | SERVICE LEVEL | CHAT ELIGIBLE? |
|---|---|---|
| COMMERCIAL | COM | NO |
| $1000 > SAVINGS ACCT >$100 | SA | YES |
| SAVINGS ACCOUNT > $1000 | SA | YES |
| SMALL BUSINESS (TOP 10%) | SB | YES |
| SMALL BUSINESS (10%+) | SB | YES |

TEXT CHAT

FIELD OF INVENTION

This invention relates to the field of text-chat between a customer or a potential customer and an online banking customer service representative or agent.

BACKGROUND

With the proliferation of the Internet, businesses are now taking advantage of using text-chat as an alternative to the telephone or email as a form of communication between the customer and the business representative in an effort to improve customer service. A customer may prefer text-chatting over a call-in telephone number to keep the customer's phone line free or to save mobile minutes that a customer pays each time the customer uses the customer's cell phone. Moreover, a customer may be more comfortable text-chatting, (e.g., if the customer was already online) and thus would request assistance that the customer otherwise would not. Likewise, customers may have a need for immediate assistance, and choose to chat rather than send an email that may be answered in a number of hours/days. Text-chat also allows a customer to communicate in their channel of choice—the internet channel.

However, text-chatting faces many of the same issues that are present when communication is performed via a telephone between a customer and a service representative. In a financial service context, traditionally a customer may be asked to provide identification information repeatedly in the duration of one service phone call. For example, before even speaking with a service representative, the customer may be asked by an automated telephone system (e.g., Interactive Voice Response or IVR) to identify the customer including, but not limited to the customer's name, account number, and/or password. After transferring the customer to the service representative, the customer may again be asked for the same or different identification information. A customer using text-chat to communicate with a service representative may face similar redundancy. Such repeated security protocols are tedious, time-consuming, but necessary to ensure security—especially considering the potential consequences should access to the customer's account be granted inappropriately.

With respect to the financial institution providing the customer service, any time spent by an agent in authenticating or confirming the identity of the customer only detracts from the time the customer service representative or agent could be spending to assist this or another customer, thus increasing costs and decreasing efficiency. Additionally, from a financial institution's perspective, not all customers are alike. For example, some customers may be entitled to specific service levels, while other customers may be entitled to other service levels. Such a distinction may be based upon the level of assistance that the customer is likely to need (e.g., newly acquired customers as a result of a merger is likely to require more assistance than an already existing customer). As such, blindly allowing all customers to be able to text-chat is not optimal and may further contribute to increasing costs and decreasing efficiency.

BRIEF SUMMARY

This summary is provided to introduce a selection of concepts in a simplified form that are further described in the Detailed Description. The summary is not intended to identify key features or essential features of the claimed subject matter, nor is it intended to limit the scope of the claimed subject matter.

In one example, in accordance with the aspects of the disclosure, a method is illustrated for determining whether to invite a user to text-chat with a customer service representative. Such a method may include verifying that the user is eligible to text-chat and further determine if other criteria are met before the user is to be invited to text-chat.

In another example in accordance with the aspects of the disclosure, a method is illustrated to allow a once-authenticated user to progress through the text-chatting process, which may include text-chatting with one or more customer service representative, without redundantly providing authentication information. In addition, the customer service representative may be provided indication that the user was authenticated at least when the user accepted a text-chat invitation.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
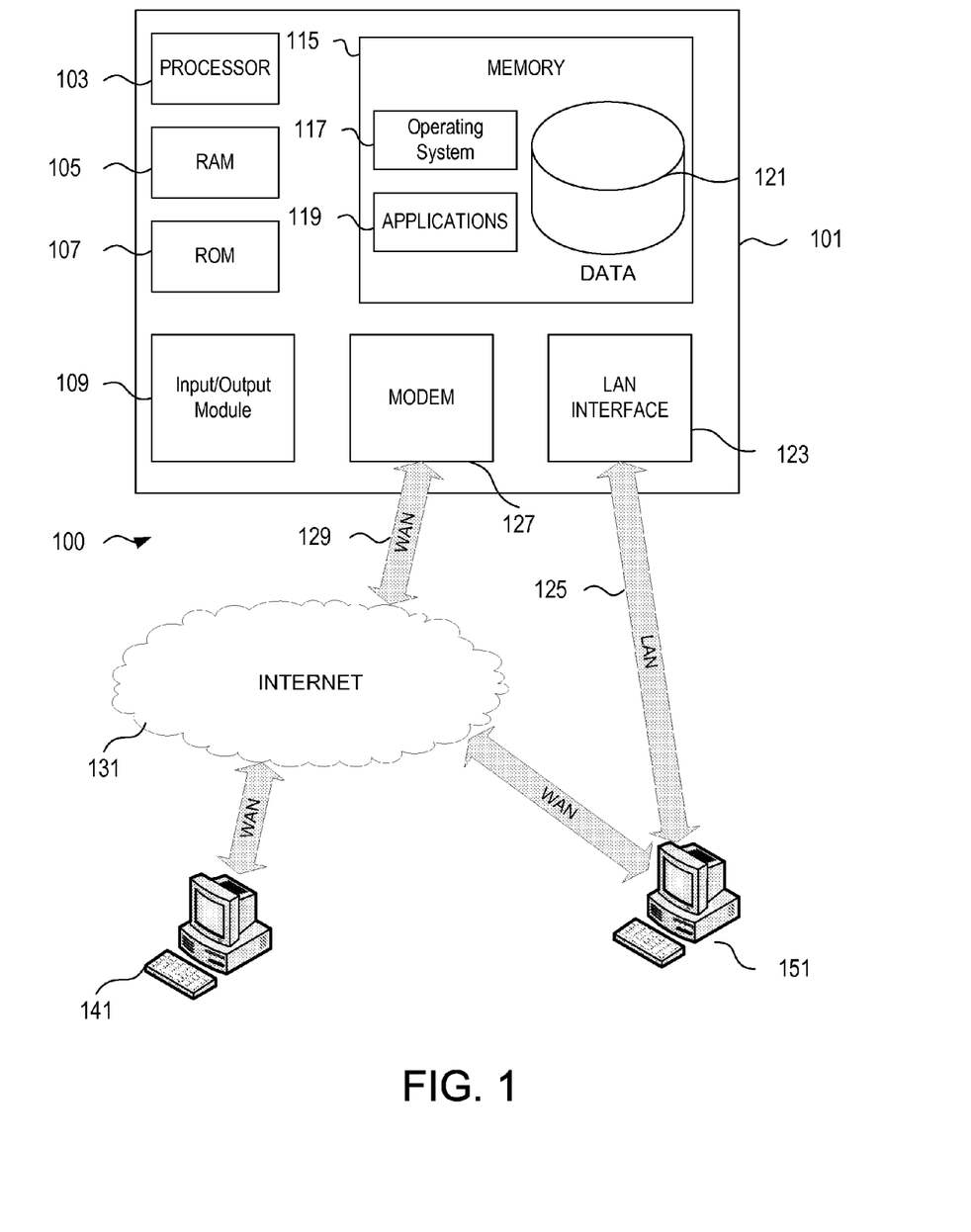
FIG. 1 illustrates a block diagram of a computing environment that may be used according to one or more aspects of the invention.

FIG. 1 illustrates a block diagram of a computing environment 100 including a generic computing device 101 (e.g., a server, laptop computer, desktop computer, mobile communication device, and the like) that may be used according to an illustrative embodiment of the invention. The computer 101 may have a processor 103 for controlling overall operation of the server and its associated components, including RAM 105, ROM 107, input/output (I/O) module 109, and memory 115. I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101 computer executable instructions may be embodied in hardware or firmware (not shown). As described in detail below, the database 121 may provide centralized storage of account information and account holder information for the entire business, allowing interoperability between different elements of the business residing at different physical locations.

The computer 101 may operate in a networked environment supporting connections to one or more remote computers, such as terminals 141 and 151. The terminals 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the computer 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In one example, terminal 141 may be a customer or a potential customer's computer used to access the customer or potential customer's online banking account available on the internet. The term "user" or refers to both customers and potential customers may be used interchangeably with those terms herein. Terminal 141 may be connected to the server 101. Server 101 may, for example, be controlled by a third-party (e.g., LivePerson, headquartered in New York, N.Y.) and may provide invitations to customers to text-chat with an available customer representative and govern a chat-connection between terminal 141 and terminal 151. Terminal 151 may be a financial institution's customer service representative work station controlled by a customer service representative familiar with the user's online banking account. Alternatively, server 101 may be controlled by and/or part of the financial institution.

As understood by those skilled in the art, the steps that follow in the figures may be implemented by one or more of the components in FIG. 1 and/or other components, including other computing devices.

The technology, such as the devices and networks described in FIG. 1 may allow an institution to operate an online banking service and further allow a customer to access the online banking service. More particularly, the customer and the institution's customer service representative or agent (the terms "customer service representative", "service representative", and "agent" may be used interchangeably herein) may be able to communicate with each other via text-chat. The user may be invited to text-chat with a service representative if certain criteria are met. In one example, the criteria may include time spent on a page, or if the user reaches an error page indicating that the user may be having problems or may require assistance to performing the functions that the user desires. By text-chatting with the user, the service representative may be able to assist and provide solutions to the user. Providing solutions may range from assisting the user in navigating the online banking service to alerting a remediation team that one or more features of the online banking service is not working properly to providing the user confidential information related to the user's account.

Figure 2:
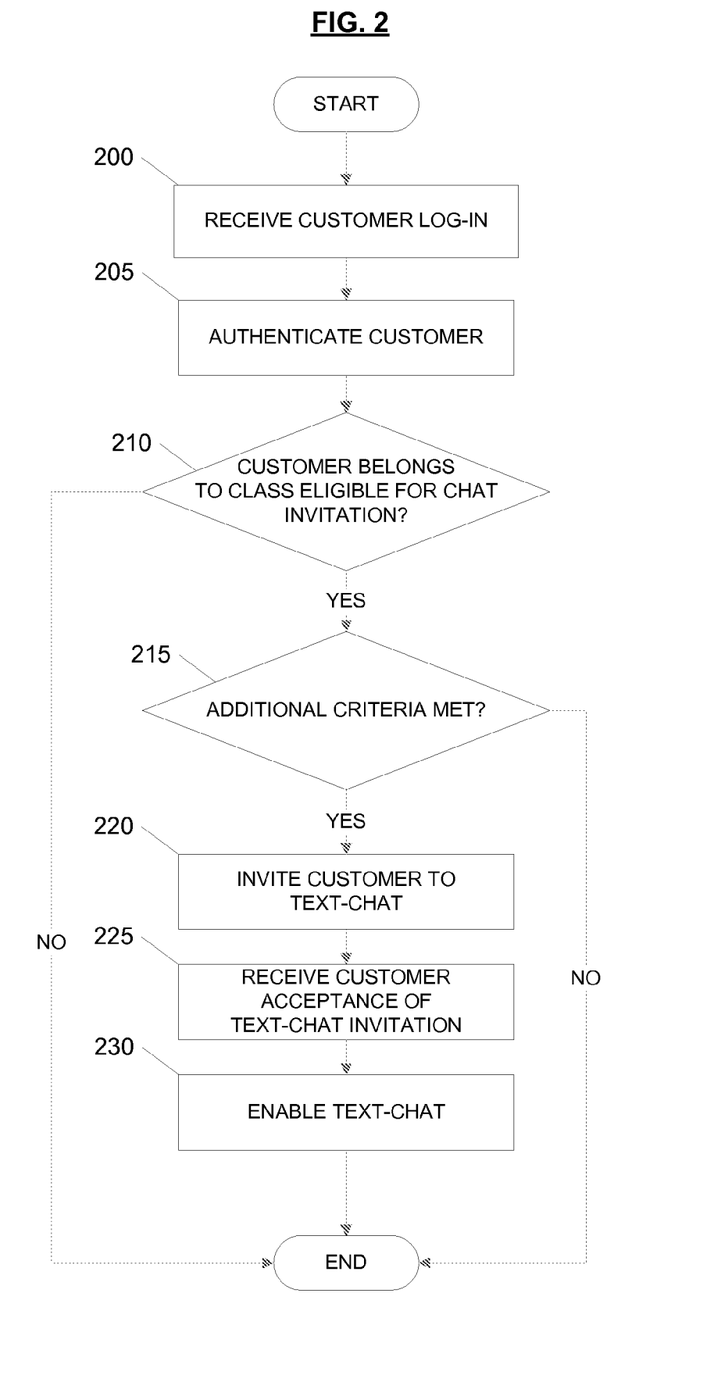
FIG. 2 illustrates a flowchart of a method of inviting a customer to text-chat in accordance with the illustrative embodiments discussed herein.

FIG. 2 illustrates a flowchart of a method of inviting a user to text-chat. At block 200, a computing device, e.g., computer 100, may receive user log-in information via a user interface (e.g., a kiosk display system, webpage, and the like). User log-in information may be used to authenticate the user and may include information such as a user identification name and a corresponding password. At block 205, the computing device may authenticate the user and allow the user to access the user's online banking account. At block 210, the computing device may determine whether the user belongs to a class of users which are eligible to be invited to text-chat with a service representative or whether the user belongs to a class of users which are not eligible to be invited to text-chat with a service representative. For example, the user may be eligible to be invited to text-chat with a service representative if the user is a new online banking customer and this is the first time that the user has logged into the user's online banking account. In another example, the user may have a certain number of assets with the bank or have been a customer of the bank for a certain amount of time and as such may be a valued customer eligible to be invited to text-chat with a customer agent representative. The user may be invited to text-chat with a customer service representative if the user is within the class of users eligible to be invited to text-chat with a service representative and at least one other criteria is met while the user is logged into the user's online banking account. For example, the user may have indicated that the user is seeking help in configuring an online billpay feature found within the online banking features available to the user. In another example, the customer may have reached (and thus triggered) certain error pages prompting an invitation to text-chat with a service representative who may be able to assist the customer. Alternatively, the criteria may be based upon the number of available service representatives available for chat. At block 215, computer 100 determines whether the one or more additional criteria are met. If the additional criteria are met, the user may be invited to chat with a customer service representative. At block 220, computer 100 may invite the user to text-chat with a customer service representative. At block 225, computer 100 may receive input from the user indicating that the user wishes to accept the chat invitation. For example, the user may click a "text-chat now with a service representative" button appearing within the current online banking webpage that the user is accessing. At block 230, computer 100 may provide a chat-window on the user's display to enable the user to input any text-messages the user wishes to send to the customer service representative and it may allow the user to receive any text messages the user receives from the customer service representative. In addition, text-chatting may include the sending and receiving of any other multimedia content, including, but not limited to graphics, streaming or clipped videos, streaming or clipped audio, web-pages, and the like.

Figure 3:
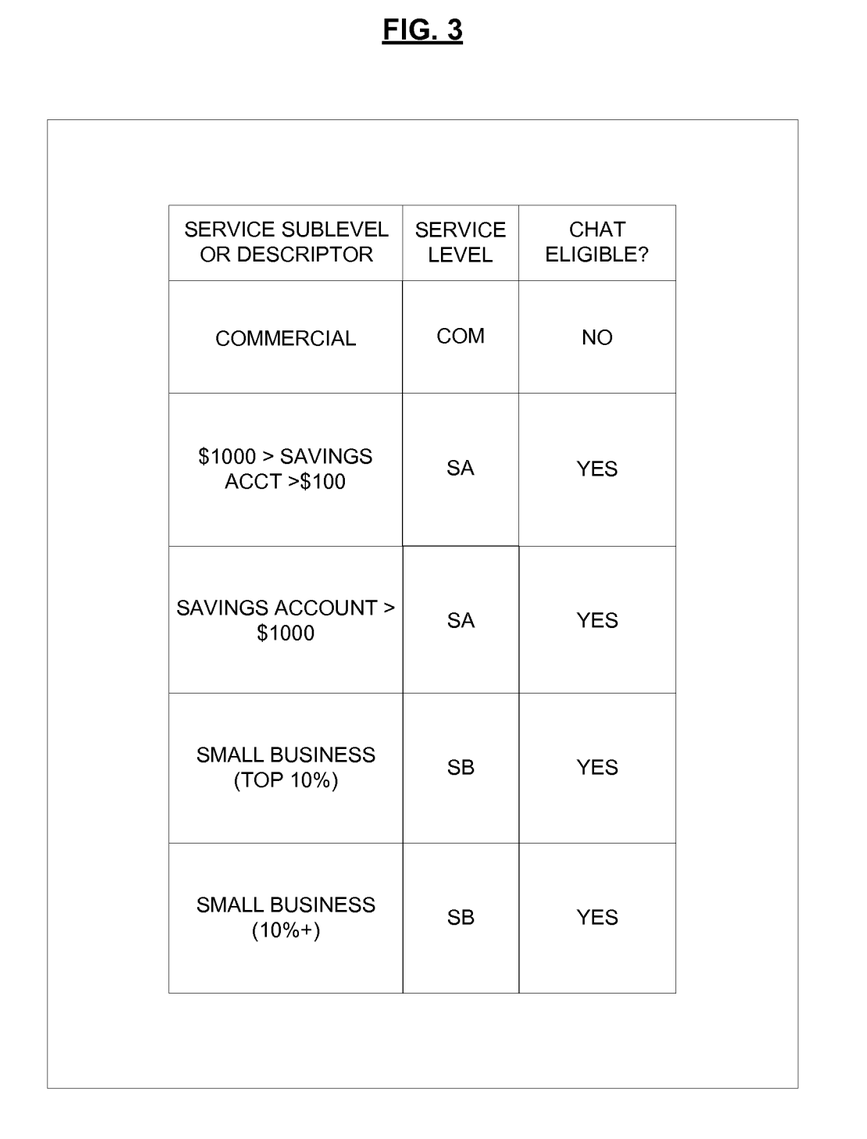
FIG. 3 illustrates an exemplary table classifying online banking customers by service level in accordance with the illustrative embodiments discussed herein.

FIG. 3 illustrates an exemplary table classifying online banking customers by service level and may be used to determine whether users of a particular service level are eligible for text-chat invitations. Each user may be slotted into one service level based on one or more criteria, such as the user's account type, amount of assets the user has with the bank, the duration that the user has been a bank customer, and the like. For example, commercial banking customers might not be eligible for text-chat sessions. In another example, certain savings account customers may be eligible for text-chat sessions, while other savings account customers might not be based on the total amount of assets in the savings account.

In another aspect, the specific criteria used may also allow a financial instution to ensure that the appropriate customer service associate is made available to the identified customers (e.g., if the financial institution does not currently have a commercial banking customer service agent trained to text-chat with a commercial banking customer, the financial institution might not invite the customer to text-chat, as to the available customer banking service agent might not be deemed capable of satisfactorily servicing the customer).

Service levels may further be used to rank customers who are eligible for text-chat invitations. A first ranking of priority may be based upon service levels. That is, customers of one particular service level (e.g. SA) may be given priority to chat with an available service representative over customers of another service level (e.g., SB). A second ranking of priority may be based on sublevels or descriptors within the same level of priority. Therefore, customers who share the same service level may be ranked differently. A customer belonging to one descriptor or sub-level within a service level (e.g., Small Business—top 10%) may be ranked differently than another customer with a different descriptor or sub-level (e.g., Small Business—10%+). For customers who are part of the same class of customers based on service level and service sublevel, prioritizing may further be done based upon any other criteria such as the total number of assets the customer has with the bank, the date that the customer first opened an online banking account with the financial institution, and/or any other criteria of the financial institution's desire (not shown). Alternatively, individuals within the same class and/or subclass may be ranked the same and priority may be randomized within the same class/or subclass.

In another aspect, the service levels may be used to diversify a user's experience. Diversifying a user's experience relates to how the user is treated as compared to another user. For example, if a user is of a particular service level or service sublevel and is visiting a particular webpage (e.g., home page of the user's online banking service or a help page within the user's online banking service), the user may be invited to chat after a pre-determined amount of time. Conversely, another user of a differently service level or a different service sublevel visiting the same particular webpage may be invited to chat after a different pre-determined amount of time. The difference in the treatment of the customers of different service levels or sublevels may, in one example, correspond to the available number of customer service representatives, the priority of the particular customer to the financial institution, and the like. Alternative to, or in addition to service levels and service sublevels, other criteria may be used to diversify a user's experience such as affinity classes (i.e., groupings based on predicted user behavior), duration as a customer (e.g., new customers as a result of merger vs. long-time customer), and the like.

The ranked users eligible for text-chatting may be invited based on the number of available customer service representatives available to assist and based on the other users eligible for text-chatting. More particularly, text-chat eligible users may be ranked and the ranking may be compared to a threshold based on the number of available service representatives to determine whether a particular text-chat eligible user is invited. For example, if a text-chat eligible user is ranked as the highest priority user and there are a hundred available customer service representatives, then that user may be invited. However, if a text-chat eligible user is ranked outside the top one hundred highest ranked users, the user might not be invited unless higher ranked text-eligible users no longer require assistance (e.g., decline the text-chat invitation, log-out before accepting the invitation, and the like) or additional customer service representatives become available.

In one instance, based on user activity while the user is logged into the user banking account, the user may cease to be a member of the class of customers who are eligible to be invited to text-chat with a customer service representative. For example, if a user changes the user's account type from a savings account (eligible for text-chat) to a commercial account (non-eligible for text-chat) during the user's text-chat session while the user is still a savings account customer, the user may finish any on-going text-chat session with a customer service representative. However, after the text-chat session is closed, based on a change in the user's classification, the user subsequently might not be invited to chat with the customer service representative again.

In another aspect, any chat session between the user and the service representative may be used as the criterion or part of the criteria to determine whether the user is invited to chat. For example, the chat logs may be scanned and/or reviewed to determine if certain words or phrases were used by the user amounting to inappropriate or abusive language. If the scan returns that inappropriate or abusive language was used by a user, the user may be placed on a "do not chat with" list and the user may automatically be banned from being eligible for chat until the user is reinstated and removed from the "do not chat with" list. Inappropriate language may be any words, phrases, symbols, graphics, videos, audio, or any other communication communicated during a text-chat session that the financial institution deems inappropriate.

In another aspect, chat session statistics may be kept and recorded and may be used to determine whether the user is invited to chat. For example, if past chat sessions with the user have exceeded a certain threshold (e.g., the average phone call duration when a customer calls in to resolve an issue), the user may no longer be eligible for a chat session. In another example, a percentage of chat sessions resulting in successful resolution may also be compared to a percentage of phone calls resulting in successful resolution to determine whether the user may be eligible for further chat. Here, the statistics may be based solely on the user's phone calls and chat sessions or the statistics may be based on an overall average. Alternatively, the statistics may be further based on the issue or predicted issue that the user may be requesting assistance on.

Potential customers (e.g., persons who might not have an account yet with the bank or individuals who may not be able to log-in or provide customer identification information) may be treated differently than those who are able to log-in. These potential customers may be asked to provide some basic information before a determination is made on whether they will be invited to chat with a service representative. For example, the information may include a name, location, whether the person has an account with the financial institution, and the issue that the person requires assistance on. Based on the information provide, the person may be invited to chat or may be directed to other avenues of assistance (e.g., invited to visit a local branch office, email, and the like). Because the person is unable to be authenticated prior to text-chatting with a service representative, the customer service representative may request certain information required to identify and assist the potential customer. This will allow the customer service representative to expeditiously locate the customer's records for authentication and subsequent servicing. This acceleration of data gathering aids in reducing contact time and costs. In one aspect, the information required may be used to assist the potential customer in enrolling into online banking and to create log-in information.

In one aspect, more than one customer service representative may text-chat simultaneously with a user. In another aspect, a customer service representative may transfer a chat-session with a user to a second customer service representative. The second customer service representative may be able to view a chat log and thus quickly and accurate be apprised of any communication between the user and any previous customer service representative, including authentication.

In another aspect, any text-chat conversation between a user and a customer-service representative which may be deemed incomplete by the customer-service representative may be marked such that the next time the user logs into the user's online banking account or contacts a customer service-representative regarding the user's account, the user may be presented with a courtesy invitation to complete the chat and/or a question regarding whether the previous issue was resolved to the user's satisfaction. The user may be presented with a chat-log to refresh the user's memory. In addition, any chat sessions between the user and the customer service representative may be saved and accessible to the user via a "chat log" tab within the user's online banking account. Such a chat log may contain instructions which may be helpful to the user and may be organized by topic, key words, date, and the like. Moreover, the user may be able to label or otherwise customizably categorize the chat logs within the user's online banking account.

Figure 4:
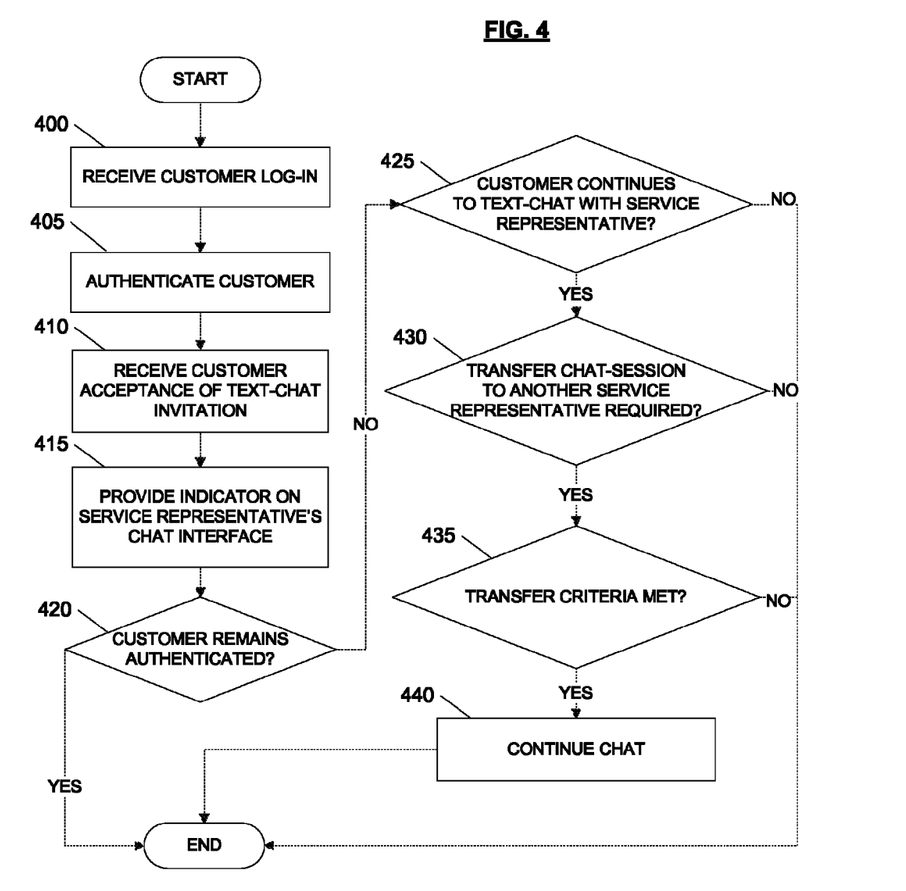
FIG. 4 illustrates a flow chart of a method of reducing the number of times that the customer may be required to provide authentication information during a text-chat session in accordance with the illustrative embodiments discussed herein.

FIG. 4 illustrates a flow chart of a method of reducing the number of times that the user may be required to provide authentication information during a text-chat session. At block 400, a computing device, e.g., computer 100 may receive user log-in information. At block 405, the user may be authenticated based on the user's log-information and may be invited to text-chat with a customer service representative if one or more other criteria is met. After the user accepts a text-chat invitation at block 410, the user is said to be as being in authenticated space since the user accepted the invitation while the user was viewing a part of the user's online banking account which may be only accessed when the user is authenticated. Computer 100, at block 415, may provide on the customer service representative's chat-session interface an indicator signifying that the user accepted the chat session invitation while concurrently authenticated into the financial system's online banking system. The indicator may be a small icon, symbol, word, or phrase. In addition, the account log-in information may be used to identify the user and computer 100 may provide a pop-up window adjacent to the customer service representative's chat-session interface. The pop-up window may include a profile which further includes, but is not limited to information such as the user's name, address, account information, and the like. If the (first) agent transfers the text-chat to another (second) agent, the second agent may be provided with the indicator and the pop-up window. As such, the second agent may verify that the user is authenticated without requesting redundant authentication information. Any subsequent agent communicating with the user may similarly verify that the user is authenticated.

At block 420, computer 100 may determine that the user is no longer authenticated during the chat session. For example, the user may have voluntarily logged out of the user's online banking account or the user may have been disconnected by a network interruption. If the user is no longer authenticated, but continues to text-chat with the customer service representative, the customer service representative may continue to service the user without requesting customer authentication information as shown at block 425. However, if, for example, the service representative is required to transfer the chat-session to another service representative at block 430, a further criteria may be required before the second service representative may continue the text-chat with the user. For example, at block 435, computer 100 may determine whether the transfer from the first service representative to the second service representative is performed within a period of time (e.g., 5 seconds). In another example, computer 100 may determine whether the transfer from the first service representative to the second service representative is within the same user text-chat session. If the transfer meets the criteria, the chat-session with the second service representative may be deemed a continuation of the chat-session with the first service representative and authentication information might not be requested from the user at block 440.

Alternatively, should the user cease to be logged into the online banking account while the user is engaged in text-chatting with a customer service representative, the customer service representative may ask the user to re-log into the user's online banking account and may cease to discuss information related to the user's banking account until the user is logged back into the user's online banking account if, for example, in the text-chat session the user requested assistance on transferring funds to a different account. Such an action may require additional security and may require re-authentication as compared to a text-chat session where the user is requesting information on how to set up or how to use certain aspects or features of the user's online banking account. In another aspect, the agent may control the chat window on the user's display and may disable the user from viewing any previous chat logs until the user re-logs in to the user's banking account.

Although not required, one of ordinary skill in the art will appreciate that various aspects described herein may be embodied as a method, a data processing system, or as a computer-readable medium storing computer-executable instructions.

Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

I claim:

1. A method comprising:
    receiving, from a user, online banking authentication information for initiating an online banking session, wherein the online banking session comprises at least viewing information within an online banking account of the user;
    evaluating, during the online banking session, one or more activities of the user;
    determining whether the user is eligible to receive an invitation to text-chat with an agent of a financial institution maintaining the online banking account, wherein determining whether the user is eligible comprises:
        identifying, during the online banking session, an activity of the one or more activities of the user for triggering the invitation to text-chat;
        determining that the user is associated with a predefined class of users that is eligible to receive the invitation to text-chat with the agent of the financial institution;
    automatically presenting, via an interface of the online banking account, a computer processor-initiated invitation to text-chat to the user when the computer processor (a) identifies that the activity of the one or more activities of the user during the online banking session satisfies one or more triggers for presenting the invitation to text-chat and (b) determines that the user is associated with the predefined class of users that are eligible to receive the invitation to text-chat with the agent of the financial institution;
    authenticating the user to a text-chat session with the agent of the financial institution based at least partially on determining that a portion of the interface of the online banking account is viewable via a display of the user; and
    initiating the text-chat session between the user and the agent based at least partially on the authenticating the user to the text-chat session.

2. The method of claim 1, wherein verifying that the user is eligible to text-chat further includes:
    determining, based on a data table that includes classification information corresponding to the plurality of service levels, whether the service level corresponding to an at least one account held by the user is eligible to text-chat.

3. The method of claim 1, wherein determining whether the user's usage of the online banking service meets the one or more criteria includes determining whether the user visited a particular page of the online banking service.

4. The method of claim 3, wherein the particular page is an error page.

5. The method of claim 3, wherein the particular web-page is a help or search page.

6. The method of claim 1, wherein determining whether the user's usage of the online banking service meets the one or more criteria includes:
    determining a location of the user, the location of the user representing a particular page of the online banking service that is currently being displayed to the user by the second computing device; and
    determining, based on the determined service level corresponding to the at least one account held by the user and the determined location of the user, a set of rules that govern the treatment of the user, wherein the set of rules establishes the one or more criteria.

7. The method of claim 6, wherein the set of rules allows for inviting the user to text-chat with the customer service representative if the user keeps the particular page of the online banking service open for a pre-determined amount of time.

8. The method of claim 1, wherein verifying that the user is eligible to text-chat further includes:
    determining a ranking of priority for the at least one account held by the user based on the service level corresponding to the at least one account; and
    determining whether the ranking of priority is above a threshold.

9. The method of claim 8, wherein the threshold is based at least in part on a comparison between a number of customer service representatives available to text-chat and a number of users eligible to text-chat.

10. The method of claim 8, wherein determining the ranking of priority for the user's at least one account held by the user further includes determining a service sublevel, wherein the service sublevel further distinguishes the at least one account held by the user within the determined service level.

11. The method of claim 10, wherein the service sublevel is based at least in part on a total number of assets in the at least one account held by the user with the financial institution.

12. The method of claim 1, wherein verifying that the user is eligible to text-chat further includes:
    scanning one or more previous chat logs to determine if the user used inappropriate language in a previous chat session; and
    determining that the user is not eligible to text-chat based on determining that the user used inappropriate language in the previous chat session.

13. The method of claim 1, wherein verifying that the user is eligible to text-chat further includes:
    in response to determining, based on past chat session statistics, that past chat session durations have exceeded a predefined threshold, determining that the user is not eligible to text-chat.

14. The method of claim 1, further comprising:
    in response to inviting the user to text-chat, receiving, by the first computing device, an acceptance of the invitation;
    verifying, by the first computing device, that the acceptance of the invitation for the text-chat session occurred within authenticated space and while at least a portion of the interface of an online banking account of the user was viewable by the user, wherein the authenticated space is any portion of the user interface of the online banking service which the user can only access or view when the user is successfully authenticated to the online banking system of a financial institution of the user;

connecting, by the first computing device, the user and the customer service representative, to allow the user and the customer service representative to communicate via the text-chat session; and in response to verifying that the acceptance of the text-chat session is made within the authenticated space, automatically displaying, by the first computing device, account information corresponding to the user's account in a window adjacent to the customer service representative's text-chat session window, wherein the customer service representative's text-chat session window includes an indicator that acceptance of the text-chat invitation occurred within the authenticated space.

15. The method of claim 14, further comprising:
determining, by the first computing device, that the user is no longer authenticated during the text-chat session; and
in response to determining that the user is no longer authenticated, allowing, by the first computing device, the text-chat session to continue without requesting the user's authentication information.

16. The method of claim 15, further comprising:
transferring, by the first computing device, the text-chat from the customer service representative to a second customer service representative; and
allowing, by the first computing device, the text-chat session to continue with the second customer service representative without requesting the user's authentication information if it is determined that the transfer meets one or more transfer criteria.

17. The method of claim 16, wherein determining that the transfer meets the one or more transfer criteria includes determining that the transfer was successfully performed within a predetermined period of time.

18. The method of claim 14, further comprising:
determining, by the first computing device, that the user is no longer authenticated during the text-chat session; and
in response to determining that the user is no longer authenticated, requesting, by the first computing device, that the user provide authentication information if it is determined that one or more authentication criteria are met.

19. The method of claim 18, wherein it is determined that the one or more authentication criteria are met if the user is requesting assistance from the customer service representative with transferring assets to a different account, not held by the user.

20. An apparatus, comprising:
a processor; and
memory storing computer-readable instructions that, when executed by the processor, cause the apparatus to:
receive, from a user, online banking authentication information for initiating an online banking session, wherein the online banking session comprises at least viewing information within an online banking account of the user;
evaluate, during the online banking session, one or more activities of the user;
determine whether the user is eligible to receive an invitation to text-chat with an agent of a financial institution maintaining the online banking account, wherein determining whether the user is eligible comprises:
identifying, during the online banking session, an activity of the one or more activities of the user for triggering the invitation to text-chat;
determining that the user is associated with a predefined class of users that is eligible to receive the invitation to text-chat with the agent of the financial institution;
automatically present, via an interface of the online banking account, a computer processor-initiated invitation to text-chat to the user when the computer processor (a) identifies that the activity of the one or more activities of the user during the online banking session satisfies one or more triggers for presenting the invitation to text-chat and (b) determines that the user is associated with the predefined class of users that are eligible to receive the invitation to text-chat with the agent of the financial institution;
authenticate the user to a text-chat session with the agent of the financial institution based at least partially on determining that a portion of the interface of the online banking account is viewable via a display of the user; and
initiate the text-chat session between the user and the agent based at least partially on the authenticating the user to the text-chat session.

21. The apparatus of claim 20, wherein verifying that the user is eligible to text-chat further includes:
determining, based on a data table that includes classification information corresponding to the plurality of service levels, whether the service level corresponding to an at least one account held by the user is eligible for text-chat.

22. The apparatus of claim 20, wherein determining whether the user's usage of the online banking service meets the one or more criteria includes determining whether the user visited a particular page of the online banking service.

* * * * *